(No Model.)
J. F. FRANKE.
AUTOMATIC INTERMITTENT HYDRAULIC TIME APPARATUS.
No. 511,075. Patented Dec. 19, 1893.
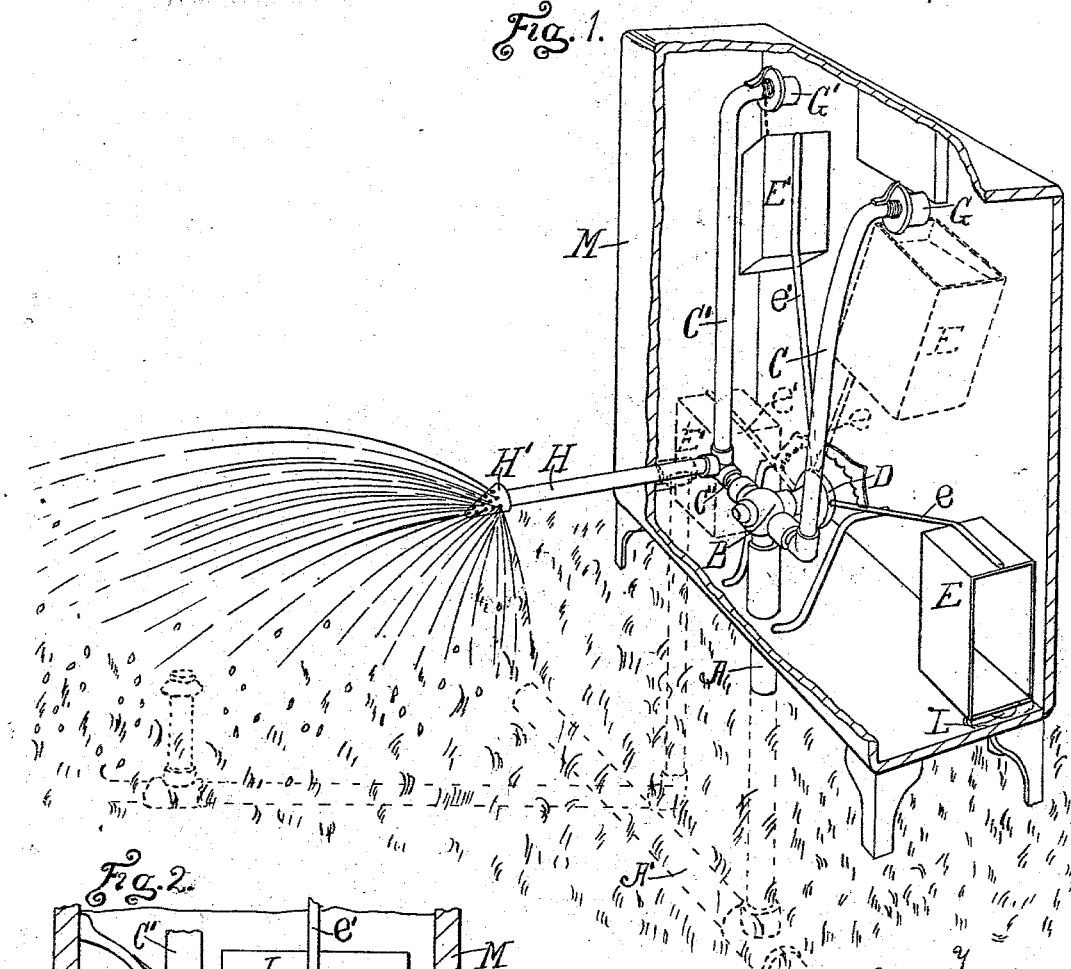
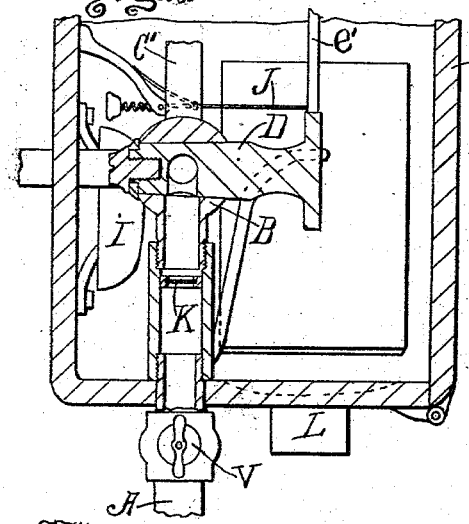
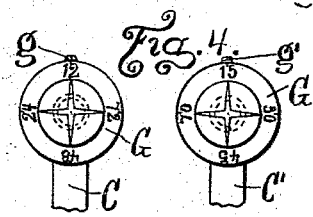
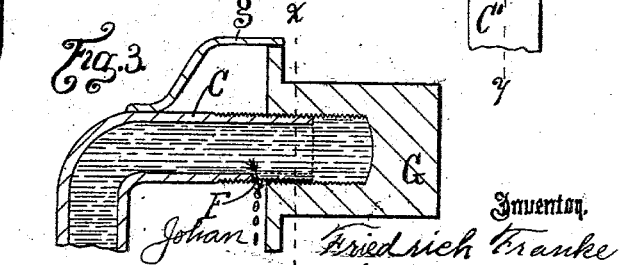
Witnesses.
P. W. Harbeson.
F. M. Townsend.
Inventor.
Johan Friedrich Franke
by Hazard & Townsend
his attys.

UNITED STATES PATENT OFFICE.

JOHAN FRIEDRICH FRANKE, OF SANTA ANA, CALIFORNIA.

AUTOMATIC INTERMITTENT HYDRAULIC TIME APPARATUS.

SPECIFICATION forming part of Letters Patent No. 511,075, dated December 19, 1893.

Application filed March 27, 1893. Serial No. 467,913. (No model.)

*To all whom it may concern:*

Be it known that I, JOHAN FRIEDRICH FRANKE, a citizen of the United States, residing at Santa Ana, in the county of Orange and State of California, have invented a new and useful Automatic Intermittent Hydraulic Time Apparatus, of which the following is a specification.

The primary object of my invention is to produce an apparatus suitable for use upon a lawn, cemetery or other place where it is desired to grow flowers or grass whereby the same may be watered intermittently but regularly for weeks or months, or in fact any length of time desired without requiring attention after being once set and connected with some source of supply of water under pressure.

My invention consists essentially in the combination of a supply pipe, two timing escape pipes connected therewith through the medium of a suitable two-way valve and provided respectively with suitable escapes to allow the escape of water therefrom; a main discharge pipe connected with one of such timing escape pipes intermediate its escape opening and such valve, and two pivotally supported valve-operating reservoirs connected with the valve and with each other and arranged and adapted respectively to be brought into position beneath their respective timing escape pipes to receive the discharge therefrom when the valve is turned to allow the water to flow into such escape pipe and arranged with such relation to the point of the pivotal support that when one reservoir is elevated to receive the discharge from the timing escape pipe, the other reservoir will be turned down into its discharging position to discharge its contents, and the centers of gravity of the two reservoirs will be on that side of the support with the depressed reservoir to retain the reservoir and valve in that position and when the elevated reservoir is sufficiently filled with water, the weight of the water in such reservoir will shift the center of gravity to that side of the support with the filled reservoir so that the filled reservoir will thereby be caused to fall thus elevating the other reservoir and at the same time turning the valve to close the passage from the supply pipe into the pipe having its escape above the depressed reservoir, and to open the passage from the supply pipe into the pipe which discharges above the elevated reservoir whereby the valve is automatically operated by the escaping water to intermittently cut off and turn on the discharge through the main discharge pipe, thus to provide for intermittently sprinkling the ground to be sprinkled. The timing pipes are arranged a short distance apart and provided respectively at their upper ends with an orifice and suitable means for enlarging or contracting their orifices to allow the escape of a determined quantity of water therethrough when the supply pipe is connected with the cut off timing pipe or with the discharge timing pipe as the case may be.

My invention also comprises various combinations and features of construction hereinafter set forth.

The accompanying drawings illustrate my invention.

Figure 1 is a perspective fragmental view of a sprinkling device embodying my invention, the back and one end of the case being removed to expose the parts. Fig. 2 is a fragmental sectional view of a portion of the case and the supply pipe and valve. Fig. 3 is a longitudinal mid-section of the timing plug for regulating the escape of the water from either of the timing pipes into their respective valve operating reservoirs. Line $y$—$y$ Fig. 5 indicates the line of section. Fig. 4 shows front views of the timing dials and plug. Fig. 5 is a sectional view of the timing plug on line indicated by $x$—$x$ Fig. 3.

A is the supply pipe which communicates with the main water supply indicated by A' in dotted lines in Fig. 1.

B is a three-way connection which is attached to the supply pipe and to which is attached the cut-off-timing reservoir filling pipe C and the discharge-timing reservoir-filling pipe C', C''. In this three-way connection is arranged a two-way valve D which is arranged to communicate respectively between the supply pipe A and the cut off reservoir filling pipe C, or between the supply pipe A and the discharge pipe C'', C', as the case may be. The pipes C and C' extend upward a suitable distance above the three-way connection and at their upper ends are bent to extend above their respective reservoirs and are provided with escape openings F to allow the water discharged from such pipes to fall respectively into the cut-off reservoir E and the discharge reservoir E' which are respectively secured to the valve D by suitable means such as the arms e e' and are arranged to operate such plug by means of the weight of the water contained in the reservoir when a certain predetermined amount is discharged into such reservoir.

The escapes of the two timing pipes C and C' are practically the same and consist of a slot F in the pipe and a regulating cap or plug G (G') arranged to screw upon the screw threaded end of the slotted escape pipe C (C') to decrease or increase the size of the escape orifice as the cap or plug is screwed on or off of the pipes. The discharge or sprinkling pipe H communicates with the cut off pipe C', C'', intermediate the valve D and the escape F and is provided upon its outer end with the sprinkler H'.

The operation of my device is intermittent and can be regulated to suit the operator. In practice it is usually desirable to operate the sprinkler for only a very small period of time, the sprinkler not being in operation except for a few minutes or a few hours at the most during each twenty-four hours, or it may be desirable to have the sprinkler brought into operation only once every two or three days.

In order to adapt my invention to be set to sprinkle at such intervals of time and for such length of time as may be deemed desirable the plugs G and G' are arranged to screw back and forth upon the head of the pipes C and C' respectively and one is provided with markings to indicate minutes of time and the other with markings to indicate hours of time. These markings are indicated in Fig. 4 by numerals 15, 30, 45 and 70 and the numerals 12, 24, 48 and 72.

g (g') indicates an index to assist in the accurate setting of the device and in practice the apparatus is designed to be arranged with such accuracy at the time of manufacture that when the plug is turned to bring the numeral 12 to the index g as shown in Fig. 4, the sprinkler will operate in every twelve hours and when set at the numeral 24 will operate once every twenty-four hours and when set at the numeral 48 will operate once every forty-eight hours and the same arrangement is applied to the cut off so that after the cut-off g' is set as shown in Fig. 4 the water would be cut off from the sprinkler when the sprinkler had been in operation fifteen minutes and so on. This variation can be made with one turn of the cap or plug G by making the slot F of decreasing width from front to rear as may be desired to accomplish the desired result.

In practice the apparatus is set at the place which it is desired to sprinkle and is connected through the medium of the supply pipe A with the water main or other source of supply A'. The cock V is then turned to admit water to the two way valve D and if the parts are in the position shown in solid lines in Fig. 1 the water will flow through the valve up through the pipe C' and out through the escape slot F and into the reservoir E' at the same time the water will flow through the sprinkler. When the reservoir E' becomes filled it over-balances and falls into the position shown by the dotted lines E' Fig. 1 thus raising the other reservoir into position indicated in dotted lines E Fig. 1. A bell or bells may be provided to give an alarm when the change is made; the mechanism which operates the bell being arranged to extend into the path of one of the arms e (e') which carries the valve operating reservoir. This is indicated in Fig. 2 but no special construction is shown and I do not limit my claim to the use of the bell. A strainer K is also provided in the supply pipe A to intercept any débris which might clog the openings F.

L is the waste hole in the bottom of the case M through which the water discharged from the reservoirs E and E' may escape.

It is to be understood that the sprinklers H' are of the proper construction to sprinkle the area desired to be sprinkled; but I do not limit my invention to any particular sprinkling apparatus nor to the regulation of sprinkling devices for my invention may be applied for use in any connection where a regular intermittent supply of water under pressure is desired and it may also be used to intermittently connect and disconnect electrical conductors, open and close gas cocks, &c., but such modifications as may be necessary to adapt my invention to such uses will readily present themselves to any one versed in the art and do not require illustration herein.

Now, having described my invention, what I claim as new, and desire to secure by Letters Patent, is—

1. The combination of the supply pipe, two timing escape pipes connected therewith through the medium of a suitable valve and provided respectively with suitable escape openings arranged to allow the escape of water therefrom; such valve; a main discharge pipe connected with one of the timing escape pipes intermediate its escape and the valve; and the pivotally supported valve operating reservoirs connected with such valve and with each other and adapted and arranged respectively to be brought into position beneath their timing escape pipes to receive the water discharged therefrom when the valve is turned to allow the water to flow into such escape pipe, and arranged with such relation to the point of their pivotal support that when one reservoir is elevated to receive the discharge from its timing escape pipe the other reservoir will be turned down into its depressed position to discharge its contents and the center of gravity of the two reservoirs will be on the side of the support with the depressed reservoir thus to retain the reservoirs and valve in that position, and so arranged that when the elevated reservoir is sufficiently filled with water the weight of the water in such reservoir will shift the center of gravity to that side of the support with the filled reservoir so that such filled reservoir will be thereby caused to fall thus elevating the other reservoir and at the same time turning the valve to cut off the passage from the supply pipe into the pipe having its escape above the depressed reservoir and to open the passage from the supply pipe into the pipe which discharges into the other reservoir whereby the valve is automatically operated by the escape water to intermittently cut off and turn on the discharge through the discharge pipe.

2. An automatic hydraulic timing device comprising the combination of a supply pipe; two timing escapes connected with such supply pipes through the medium of a suitable valve; such valve; and two valve operating reservoirs connected with such valve and arranged to respectively receive the discharge from such escapes respectively, and adjusted respectively to be over-balanced when filled to operate to open or to close the valve and to bring the other reservoir into position to receive the escape from the other pipe.

JOHAN FRIEDRICH FRANKE.

Witnesses:
JAMES R. TOWNSEND,
JULIUS REINHAUS.